(12) United States Patent
Black et al.

(10) Patent No.: US 8,169,981 B2
(45) Date of Patent: May 1, 2012

(54) METHOD AND MOBILE STATION FOR CONTROLLING COMMUNICATION VIA A RADIO LINK

(75) Inventors: Greg Black, Vernon Hills, IL (US); Niels Peter Skov Andersen, Roskilde (DK); Mark Pecen, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 929 days.

(21) Appl. No.: 10/284,670

(22) Filed: Oct. 31, 2002

(65) Prior Publication Data

US 2004/0085940 A1    May 6, 2004

(51) Int. Cl.
*H04J 3/00* (2006.01)
(52) U.S. Cl. .................. 370/337; 370/278; 370/329
(58) Field of Classification Search .................. 370/216, 370/241, 242, 310, 311, 328, 329, 336, 337, 370/347, 278, 458
See application file for complete search history.

(56) References Cited

U.S. PATENT DOCUMENTS

| | | | |
|---|---|---|---|
| 6,087,949 A * | 7/2000 | Yanagida | 340/635 |
| 2002/0131396 A1 | 9/2002 | Knuutila et al. | |
| 2004/0204091 A1* | 10/2004 | Liu et al. | 455/558 |

FOREIGN PATENT DOCUMENTS

| | | |
|---|---|---|
| EP | 1 193 885 A2 | 4/2002 |
| GB | 2339113 A * | 1/2000 |
| GB | 2355367 | 4/2001 |
| JP | 8289366 A | 11/1996 |
| JP | 9307496 A | 11/1997 |
| JP | 09-326749 A | 12/1997 |
| JP | 2000-324022 A | 11/2000 |
| JP | 2002165261 A | 6/2002 |
| KR | 100205783 B1 | 4/1999 |
| WO | 9312505 A1 | 2/1993 |
| WO | 96/33555 A1 | 10/1996 |
| WO | WO 00/31990 | 6/2000 |

OTHER PUBLICATIONS

JAPA Office Action, dated Oct. 6, 2009; counterpart Japanese Patent Application No. 2004-550077; 4 pages.
Indian Patent Office, "First Examination Report", Indian Patent Application No. 1571/DELNP/2004, dated Mar. 3, 2005, 2 pages.
Japanese Patent Application No. 2004-550077, "First Office Action", dated Mar. 12, 2009, 3 pages.

* cited by examiner

*Primary Examiner* — Jason Mattis

(57) ABSTRACT

A method (400) and a mobile station (160) for controlling communication via a radio link based on a multi-slot based power class designation are described herein. The mobile station (160) may provide a multi-slot based power class designation to the communication network (110) to establish a radio link for communication service. The designation may be associated with a power level of the mobile station (160) and a number of slots corresponding to the power level. Based on the designation, the mobile station (160) may communicate with the communication network (110) via the radio link.

21 Claims, 3 Drawing Sheets

| POWER CLASS | MAX OUTPUT POWER (dBm) | POWER(W) VERSUS SLOTS | | | | | | | |
|---|---|---|---|---|---|---|---|---|---|
| | | 1 | 2 | 3 | 4 | 5 | 6 | 7 | 8 |
| 2 | 39 | 7.943 | 15.887 | 23.830 | 31.773 | 39.716 | 47.660 | 55.603 | 63.546 |
| 3 | 37 | 5.012 | 10.024 | 15.036 | 20.047 | 25.059 | 30.071 | 35.083 | 40.095 |
| 4 | 33 | 1.995 | 3.991 | 5.986 | 7.981 | 9.976 | 11.972 | 13.967 | 15.962 |
| 5 | 29 | 0.794 | 1.589 | 2.383 | 3.177 | 3.972 | 4.766 | 5.560 | 6.355 |

| POWER CLASS | MAX OUTPUT POWER (dBm) | POWER(W) VERSUS SLOTS | | | | | | | |
|---|---|---|---|---|---|---|---|---|---|
| | | 1 | 2 | 3 | 4 | 5 | 6 | 7 | 8 |
| 2 | 39 | 7.943 | 15.887 | 23.830 | 31.773 | 39.716 | 47.660 | 55.603 | 63.546 |
| 3 | 37 | 5.012 | 10.024 | 15.036 | 20.047 | 25.059 | 30.071 | 35.083 | 40.095 |
| 4 | 33 | 1.995 | 3.991 | 5.986 | 7.981 | 9.976 | 11.972 | 13.967 | 15.962 |
| 5 | 29 | 0.794 | 1.589 | 2.383 | 3.177 | 3.972 | 4.766 | 5.560 | 6.355 | ately, to a method and a mobile
METHOD AND MOBILE STATION FOR CONTROLLING COMMUNICATION VIA A RADIO LINK

TECHNICAL FIELD

The present disclosure relates to wireless communication systems, and more particularly, to a method and a mobile station for controlling communication via a radio link.

BACKGROUND

Typically, mobile stations (e.g., cellular telephones) have a maximum number of transmit timeslots and a maximum transmit power level. In Time Division Duplex (TDD) communication systems, for example, the maximum uplink data rate of a mobile station is based on the number of timeslots. That is, the mobile station may transmit data at a faster rate when more timeslots are available for the mobile station to use. In many situations, however, mobile stations cannot provide the maximum data rate at the maximum power level because of overheating of the transmitter circuitry. In a General Packet Radio Service (GPRS) network or an Enhanced Data rate for Global Evolution (EDGE) network, for example, a mobile station may limit the output power to a maximum power level based on a power class designation (i.e., a power class mark). The mobile station may provide the power class designation to the network, which in turn, adjusts the power level of the mobile station to regulate the signal level arriving at a base station controlled by the network. In some circumstances, the mobile station may need to operate at a higher power and a slower data rate for better quality of service or vice versa. For example, when the mobile station is farther away from the base station, higher output power from the mobile station may be necessary to communicate with the base station. In contrast, the mobile station may operate at a faster data rate (i.e., more timeslots) when the mobile station is closer to the base station.

One aspect of designing a wireless communication system is to optimize resources available to mobile stations. That is, different environments and applications may require the mobile station to use different resources. In a data application such as a web-browsing, for example, the mobile station may need to operate at a lower power level so that a faster data rate (i.e., more timeslots) may be available to transmit data to the communication network. Otherwise, as noted above, the transmitter circuitry within the mobile station may overheat by operating at a maximum power level and a maximum data rate. Therefore, a need exists to optimize communication via a radio link by trading off between power level and data rate of the mobile station.

BRIEF DESCRIPTION OF THE DRAWINGS

This disclosure will describe several embodiments to illustrate its broad teachings. Reference is also made to the attached drawings.

DETAILED DESCRIPTION

Figure 1:
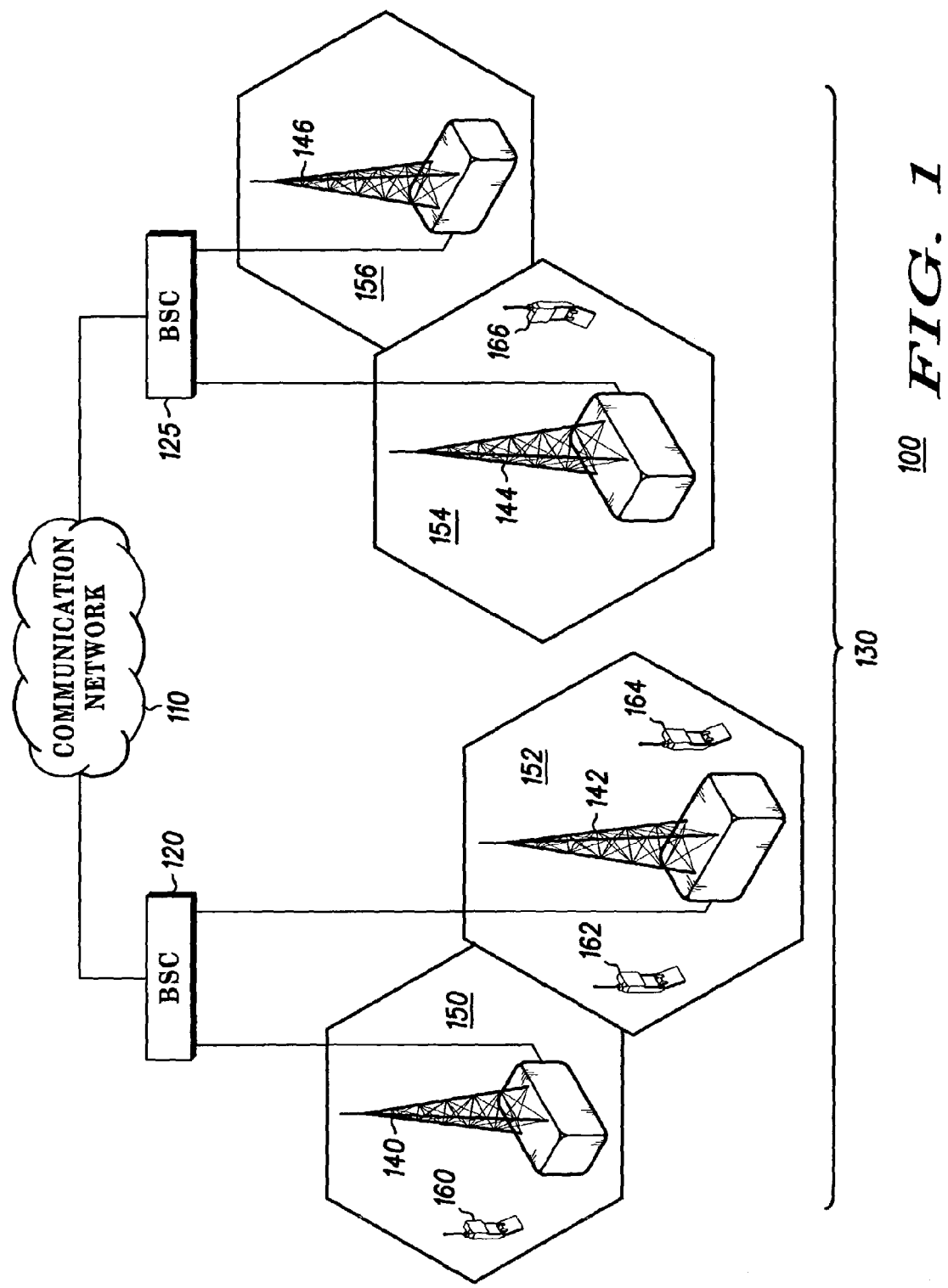
FIG. 1 is a block diagram representation of a wireless communication system.

A method and a mobile station for controlling communication via a radio link are described. In a wireless communication system, a communication network is operable to provide communication services to a mobile station. The mobile station may provide a multi-slot based power class designation to the communication network. In particular, the multi-slot based power class designation may be associated with a power level of the mobile station and a number of slots corresponding to the power level. To prevent components (e.g., a transmitting unit) within the mobile station from overheating, the power level may be lower than the maximum output power of the mobile station. The number of slots corresponds to the power level such that the mobile station may operate at a lower output power but at a faster data rate. That is, the number of slots is proportional to the data rate of the mobile station so that a greater number of slots results in a faster data rate. Accordingly, the communication network may be informed of the capabilities of the mobile station. Based on the multi-slot based power class designation, the communication network may assign radio resources to the mobile station to establish communication via a radio link (e.g., uplink or downlink). For example, the communication network may provide an assignment message including an assigned power level and an assigned number of slots. Accordingly, the mobile station may transmit data to the communication network via an uplink in accordance with the assigned power level and the assigned number of slots.

During communication with the communication network via the radio link, the mobile station may monitor an operating parameter such as, but not limited to, a thermal parameter and a power parameter associated with the mobile station. For example, the mobile station may monitor the temperature of a transmitting unit within the mobile station to determine whether the temperature exceeds a threshold. The threshold may be associated with a condition suggesting overheating of a component (e.g., the transmitting unit) within the mobile station. Upon detecting that the operating parameter exceeds the threshold, the mobile station may suspend communication with the communication network via the radio link to prevent overheating within the mobile station.

A communication system in accordance with the present disclosure is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular system, the IS-95 Code Division Multiple Access (CDMA) digital cellular system, the CDMA 2000 system, the Wideband CDMA (W-CDMA) system, the Personal Communications System (PCS), the Third Generation (3G) system, the Universal Mobile Telecommunications System (UMTS) and variations and evolutions of these protocols. A wireless communication system is a complex network of systems and elements. Typical systems and elements include (1) a radio link to mobile stations (e.g., a cellular telephone or a subscriber equipment used to access the wireless communication system), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a switching system, typically including a mobile switching center (MSC), to perform call processing within the system, and (5) a link to the land line, i.e., the public switch telephone network (PSTN) or the integrated services digital network (ISDN).

A base station subsystem (BSS) or a radio access network (RAN), which typically includes one or more base station controllers and a plurality of base stations, provides all of the radio-related functions. The base station controller provides all the control functions and physical links between the switching system and the base stations. The base station controller is also a high-capacity switch that provides functions such as handover, cell configuration, and control of radio frequency (RF) power levels in the base stations.

The base station handles the radio interface to the mobile station. The base station includes the radio equipment (transceivers, antennas, amplifiers, etc.) needed to service each communication cell in the system. A group of base stations may be controlled by a base station controller. Thus, the base station controller operates in conjunction with the base station as part of the base station subsystem to provide the mobile station with real-time voice, data, and multimedia services (e.g., a call).

Referring to FIG. 1, a wireless communication system 100 includes a communication network 110, and a plurality of base station controllers (BSC), generally shown as 120 and 125, servicing a total service area 130. As is known for such systems, each BSC 120 and 125 has associated therewith a plurality of base stations (BS), generally shown as 140, 142, 144, and 146, servicing communication cells, generally shown as 150, 152, 154, and 156, within the total service area 130. The BSCs 120 and 125, and base stations 140, 142, 144, and 146 are specified and operate in accordance with the applicable standard or standards for providing wireless communication services to mobile stations (MS), generally shown as 160, 162, 164, and 166, operating in communication cells 150, 152, 154, and 156, and each of these elements are commercially available from Motorola, Inc. of Schaumburg, Ill.

Figure 2:
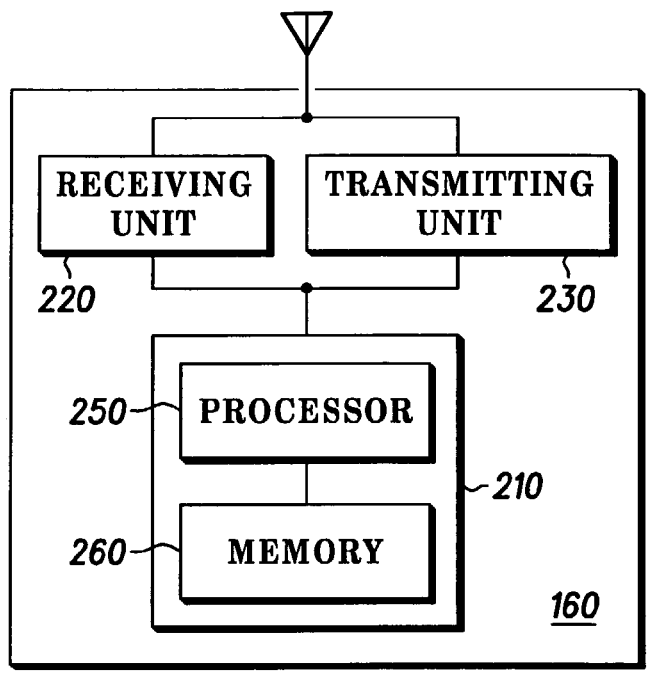
FIG. 2 is a block diagram representation of a mobile station.

Referring to FIG. 2, a mobile station (one shown as 160 in FIG. 1) adapted to control communication via a radio link is shown. The mobile station 160 generally includes a controller 210, a receiving unit 220, and a transmitting unit 230. The controller 210 includes a processor 250 and a memory 260. The processor 250 is operatively coupled to the memory 260, which stores a program or a set of operating instructions for the processor 250. The processor 250 executes the program or the set of operating instructions such that the mobile station 160 operates as described herein. The program of the set of operating instructions may be embodied in a computer-readable medium such as, but not limited to, paper, a programmable gate array, an application specific integrated circuit (ASIC), an erasable programmable read only memory (EPROM), a read only memory (ROM), a random access memory (RAM), a magnetic media, and an optical media. The receiving unit 220 and the transmitting unit 230 are operatively coupled to the controller 210. Persons of ordinary skill in the art will readily appreciate that the receiving unit 220 and the transmitting unit 230 may be separate components as shown in FIG. 2 or integrated into a single component (e.g., a transceiver unit).

Figure 3:
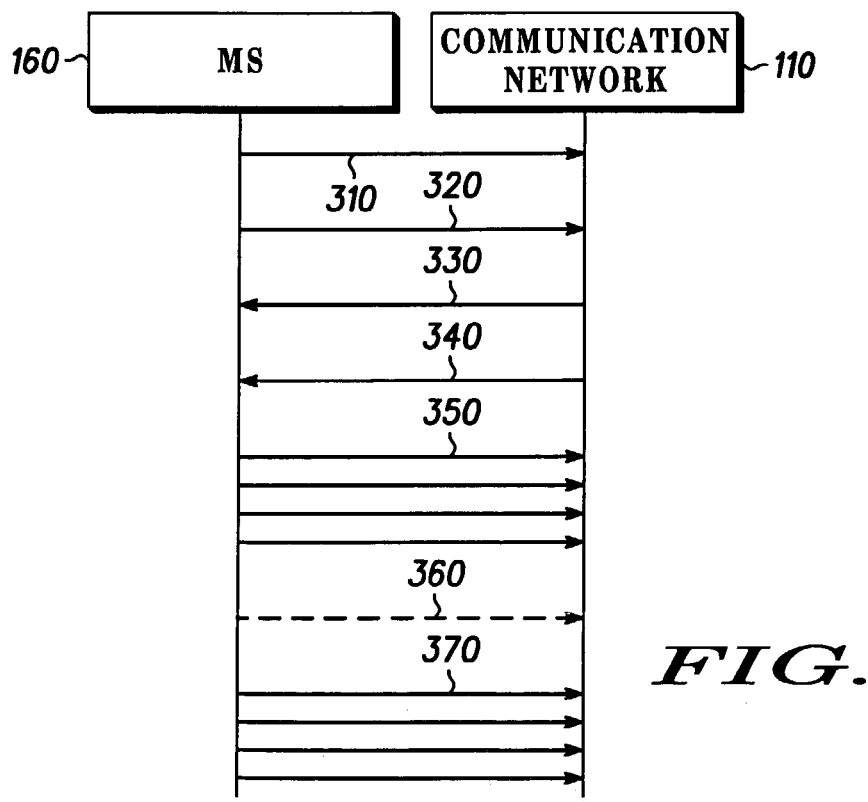
FIG. 3 is a flow diagram representation of a call flow by the mobile station.

Referring to FIG. 3, a basic flow 300 for controlling communication via a radio link may start with the mobile station 160 informing the communication network 110 of its capabilities. In particular, the mobile station 160 may provide a multi-slot based power class designation 310 to the communication network 110. For example, the mobile station 160 may register the multi-slot based power class designation 310 with communication network 10 when the mobile station 160 is turned on (i.e., via a registration for communication services). The multi-slot based power class designation 310 may be associated with the capabilities of the mobile station such as, but not limited to, a power level of the mobile station 160 and a number of slots corresponding to the power level. To prevent components (e.g., the transmitting unit 230) within the mobile station 160 from overheating, the power level may be lower than the maximum output power of the mobile station 160. The number of slots corresponds to the power level such that the mobile station 160 may operate at a lower output power but at a faster data rate. That is, the number of slots is proportional to the data rate of the mobile station 160 so that a greater number of slots results in a faster data rate.

The multi-slot based power class designation 310, for example, may be a number ranging from zero (0) to thirty-two (32), where zero (0) represents no reduction in power level as described in detail below. Alternatively, the power class designation 310 may be represented by an 8-bit binary code with bits 2 through 8 corresponding to the number of slots. To illustrate this concept, a binary code of 0010 0000 may represent a reduction in power class by one (1) increment if the number of slots increases to three (3) (i.e., bit 3 is a logic 1) whereas a binary code of 0011 0000 may represent a reduction in power class by one (1) if the number of slots increases to either three (3) or four (4) (i.e., bit 3 and bit 4 are logic 1s). In another example, a binary code of 0110 0100 may represent a reduction in power class by one (1) increment if the number of slots increases to two (2), three (3) or six (6) whereas a binary code of 0110 0010 may represent a reduction in power class by one (1) increment if the number of slots increases to two (2), three (3) or seven (7).

Figures 4, 5:
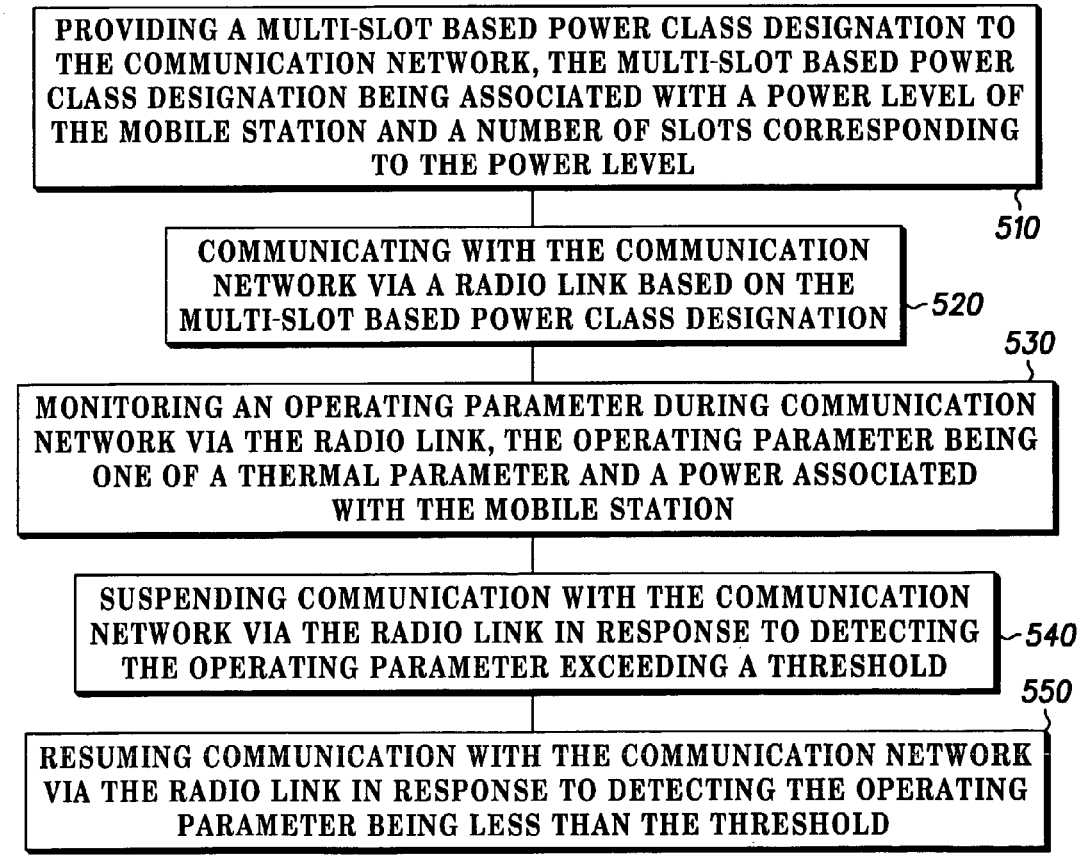
FIG. 4 is a table representation of power levels and slots associated with a multi-slot based power class designation.
FIG. 5 is a flow diagram illustrating a method for controlling communication via a radio link based on a multi-slot based power class designation.

Referring to FIG. 4, the power classes and the number of slots available for a multi-slot based power class designation of 0100 0011 are shown. Here, the power class may be reduced by one (1) increment if the number of slots increases to two (2), seven (7) or eight (8). In particular, a power class of 2 corresponds to a maximum output power of 39 dBm (i.e., 7.9433 watts (W)) and supports one slot. Persons of ordinary skills in the art will readily recognize that dBm may be used to express an absolute value of power relative to a milliwatt (mW), i.e., 0 dBm is equivalent to 1 mW. As the power class increases, the output power of the mobile station 160 corresponding to the power class reduces but the number of slots corresponding to the power class increases. For example, a power class of 3 corresponding to a maximum output power of 37 dBm (i.e., 5.012 W) may support two (2) slots, and a power class of 5 corresponding to a maximum output power of 29 dBm (i.e., 0.79433 W) may support eight (8) slots. The multi-slot based power class designation 310 may provide power classes corresponding to output powers lower than the maximum output power of the mobile station 160 (i.e., 39 dBm as shown in FIG. 4) so that the number of slots available to the mobile station 160 may increase without exceeding a maximum power dissipation threshold (i.e., the non-shaded regions of FIG. 4). That is, the mobile station 160 may transmit at a faster data rate (i.e., a higher number of slots) without overheating the transmitting unit 230 within the mobile station 160 by operating at lower power levels.

To avoid overheating, for example, the mobile station 160 may be calibrated with a maximum power dissipation threshold of 15 W. Persons of ordinary skill in the art will readily recognize that the maximum power dissipation threshold is based on the maximum output power of the mobile station 160 (i.e., the power dissipation is directly proportional to or proportional to the square root of the output power). Accordingly, power classes 3, 4, and 5 may support multiple slots without exceeding the maximum power dissipation of 15 W (i.e., only one timeslot is available at the power class of 2 without exceeding the maximum power dissipation of 15 W). In particular, the multi-slot based power class of 3 may support two (2) slots without exceeding the maximum power dissipation of 15 W. In a similar manner, the multi-slot based power class of 4 may support seven (7) slots, and the multi-slot based power class of 5 may support eight (8) slots. The mobile station 160 may tradeoff between power and data rate because the maximum output power decreases as the number of slots available to the mobile station 160 for communication increases. That is, the maximum output power of the mobile station 160 decreases from 37 dBm at the multi-slot based power class of 3 to 29 dBm at the multi-slot based power class of 5. However, the multi-slot power class of 5 may support a faster data rate than the multi-slot based power class of 3. Without exceeding the maximum power dissipation of 15 W, for example, eight (8) timeslots may be available at the multi-slot based power class of 5 whereas only two (2) timeslots may be available at the multi-slot based power class of 3.

Referring back to FIG. 3, the communication network 110 may store the multi-slot based power class designation from the mobile station 160. Upon receiving a request 320 for communication resources from the mobile station 160 for communication service, the communication network 110 may retrieve the multi-slot based power class designation to assign communication resources. For example, the mobile station 160 may initiate a data application (e.g., web-browsing) or switch from a voice application to the data application. Accordingly, the mobile station 160 may request for communication resources to transmit data to the communication network 110 via an uplink.during the data application. In particular, the communication network 110 may assign communication resources to the mobile station 160 based on the capabilities of the mobile station 160 and uplink conditions so as to maximize data throughput while maintaining the mobile station 160 below a thermal threshold (i.e., to prevent the mobile station 160 from overheating). To do so, the communication network 110 may tradeoff between power and data rate. Based on the multi-slot based power class designation, the communication network 110 may assign the mobile station 160 to operate at either a lower power level or a lower number of slots so that quality of service may be optimized. For example, the mobile station 160 may operate at a higher power level but at a slower data rate (i.e., lower number of slots) when the mobile station 160 is farther away from the base station 140. In contrast, the mobile station 160 may operate at a faster data rate (i.e., higher number of slots) but at a lower power level when the mobile station 160 is closer to the base station 140.

Accordingly, the communication network 110 may assign communication resources to the mobile station 160 based on the multi-slot based power class designation. The communication network 110 may transmit an assignment message 330 including information associated with communication resources available for the mobile station 160 to establish a radio link. For example, the assignment message may include an assigned power level and an assigned number of slots available for the mobile station 160 based on the multi-slot based power class designation. The assigned power level may be lower than the maximum output power of the mobile station 160 but the assigned number of slots may permit the mobile station 160 to operate at a faster date rate than the previously assigned data rate. Upon receiving a right to transmit 340 from the communication network 110, the mobile station 160 may transmit data 350 to the communication network 110 via the uplink.

During the transmission of data to the communication network 110 via the uplink, the mobile station 160 may monitor an operating parameter associated with the mobile station 160 to prevent the mobile station 160 from overheating. The operating parameter may be, but is not limited to, a thermal parameter and a power parameter. For example, the controller 210 may monitor the temperature of the transmitting unit 230 within the mobile station 160 and determine whether the temperature exceeds a threshold. The threshold may be associated with a condition suggesting overheating of the mobile station 160. The controller 210 may also monitor the temperature of other components within the mobile station 160 because the heat generated by the transmitting unit 230 may cause other components to exceed the threshold.

If the thermal parameter exceeds the threshold then the mobile station 160 may suspend transmission of data 360 to the communication network 110 via the uplink. When the thermal parameter falls below the threshold, the mobile station 160 may resume transmission of data 370 via the uplink.

One possible implementation of the computer program executed by the mobile station 160 (e.g., via the processor 250) is illustrated in FIG. 5. Persons of ordinary skill in the art will appreciate that the computer program can be implemented in any of many different ways utilizing any of many different programming codes stored on any of many computer-readable mediums such as a volatile or nonvolatile memory or other mass storage device (e.g., a floppy disk, a compact disc (CD), and a digital versatile disc (DVD)). Thus, although a particular order of steps is illustrated in FIG. 5, persons of ordinary skill in the art will appreciate that these steps can be performed in other temporal sequences. Again, the flow chart 500 is merely provided as an example of one way to program the mobile station 160 to control communication via a radio link based on a multi-slot based power class designation. The flow chart 500 begins at step 510, wherein the mobile station 160 provides a multi-slot based power class designation to a communication network (one shown as 110 in FIG. 1). The multi-slot based power class designation may be associated with a power level of the mobile station 160 and a number of slots corresponding to the power level. In return, the communication network may provide the mobile station with communication resources based on the multi-slot based power class designation so that the mobile station 160 at step 520 may communicate with the communication network via a radio link. For example, the mobile station 160 may switch from a voice application (e.g., a voice call) to a data application (e.g., web-browsing), which may require a faster data rate. Accordingly, the mobile station 160 may receive an assignment message from the communication network based on the multi-slot based power class designation. The assignment message may include an assigned power level and an assigned number of slots. The assigned power level may be lower than the maximum output power of the mobile station 160 but the assigned number of slots may be greater than the number of slots available for the voice application such that the mobile station 160 may operate at a faster date rate during the data application than during the voice application. In addition to the multi-slot based power class designation, the communication network may determine the assigned power level and the assigned number of slots based on radio link conditions (e.g., signal strength of the mobile station 160 and/or distance from a base station) to maximize data throughput. Upon receiving the assignment message, the mobile station 160 may transmit data to the communication network via an uplink based on the assigned power level and the assigned number of slots to prevent overheating.

To further prevent overheating, the mobile station 160 at step 530 may monitor an operating parameter associated with the mobile station 160 during communication with the communication network via the radio link. For example, the operating parameter may be a thermal parameter (i.e., temperature) of a component within the mobile station 160 such as, but not limited to, a transmitting unit. If the mobile station 160 detects that the thermal parameter exceeds a threshold then the mobile station 160 at step 540 may suspend communication with the communication network via the radio link. Upon detecting that the thermal parameter falls below the threshold, the mobile station 160 at step 550 may resume communication with the communication network via the radio link.

Although the embodiments disclosed herein are particularly well suited for communication protocols with data rates based on timeslots such as time division multiple access (TDMA) based communication protocols, persons of ordinary skill in the art will readily appreciate that the teachings are in no way limited to those communication protocols. On the contrary, persons of ordinary skill in the art will readily appreciate that the teachings of this disclosure can be employed for other variations of data rates.

Many changes and modifications to the embodiments described herein could be made. The scope of some changes is discussed above. The scope of others will become apparent from the appended claims.

What is claimed is:

1. In a wireless communication system, wherein a communication network is operable to provide communication services to a mobile station, a method for controlling communication via a radio link based on a multi-slot based power class designation, the method comprising:
providing a multi-slot based power class designation to the communication network, the multi-slot based power class designation being associated with a plurality of power levels of the mobile station and a number of slots corresponding to each of the plurality of power levels and
communicating with the communication network via a radio link based on the multi-slot based power class designation.

2. The method of claim 1 further comprising:
monitoring an operating parameter during communication with the communication network via the radio link, the operating parameter being one of a thermal parameter and a power parameter associated with the mobile station; and
suspending communication with the communication network via the radio link in response to detecting the operating parameter exceeding a threshold.

3. The method of claim 2, wherein the step of monitoring an operating parameter associated with the mobile station during communication with the communication network via the radio link comprises monitoring the temperature of a transmitting unit within the mobile station during transmission of data to the communication network via an uplink.

4. The method of claim 1, wherein the step of providing a multi-slot based power class designation to the communication network comprises providing a user-selectable, multi-slot based power class designation to the communication network.

5. The method of claim 1, wherein the step of communicating with the communication network via a radio link based on the multi-slot based power class designation comprises:
receiving an assignment message from the communication network based on the multi-slot based power class designation, the assignment message including an assigned power level and an assigned number of slots; and
transmitting data to the communication network via an uplink based on the assigned power level and the assigned number of slots.

6. The method of claim 1, wherein the communication system comprises a time division multiple access (TDMA) based communication system.

7. The method of claim 1 wherein said multi-slot based power class designation includes a number of bits corresponding to the number of slots; and wherein each bit of the multi-slot based power class designation which has a predefined bit value defines the number of allowable slots, corresponding to one of the associated plurality of power levels.

8. In a wireless communication system, wherein a communication network is operable to provide communication services, a mobile station for controlling communication via a radio link based on a multi-slot based power class designation, the mobile station comprising:
a transmitting unit; and
a controller operatively coupled to the transmitting unit, the controller having a memory and a processor operatively coupled to the memory,
the controller being programmed to provide a multi-slot based power class designation to the communication network, the multi-slot based power class designation being associated with a plurality of power levels of the mobile station and a number of slots corresponding to each of the plurality of power levels, and
the controller being programmed to communicate with the communication network via a radio link based on the multi-slot based power class designation.

9. The mobile station of claim 8, wherein the controller is programmed to monitor an operating parameter during communication with the communication network via the radio link, the operating parameter being one of a thermal parameter and a power parameter associated with the mobile station, and the controller is programmed to suspend communication with the communication network via the radio link in response to detecting the operating parameter exceeding a threshold.

10. The mobile station of claim 9, wherein the controller is programmed to suspend transmission of data to the communication network via an uplink in response to detecting the operating parameter exceeding a threshold, the threshold being associated with a condition suggesting overheating of the transmitting unit.

11. The mobile station of claim 8, wherein the controller is programmed to receive an assignment message from the communication network based on the multi-slot based power class designation, the assignment message including an assigned power level and an assigned number of slots, and the controller is programmed to transmit data to the communication network via an uplink based on the assigned power level and the assigned number of slots.

12. The mobile station of claim 8, wherein the multi-slot based power class designation is user-selectable.

13. The mobile station of claim 8 is operable in accordance with a time division multiple access (TDMA) based communication protocol.

14. In a wireless communication system, wherein a communication network provides communication services for a mobile station, and wherein a processor operates in accordance with a computer program embodied on a non-transitory computer-readable medium for controlling communication via a radio link based on a multi-slot based power class designation, the computer program comprising:
- a first routine that directs the processor to provide a multi-slot based power class designation to the communication network, the multi-slot based power class designation being associated with a plurality of power levels of the mobile station and a number of slots corresponding to each of the plurality of power levels; and
- a second routine that directs the processor to communicate with the communication network via a radio link based on the multi-slot based power class designation.

15. The computer program of claim 14 further comprising:
- a third routine that directs the processor to monitor an operating parameter during communication with the communication network via the radio link, the operating parameter being one of a thermal parameter and a power parameter associated with the mobile station; and
- a fourth routine that directs the processor to suspend communication with the communication network via the radio link in response to detecting the operating parameter exceeding a threshold.

16. The computer program of claim 15, wherein the third routine comprises a routine that directs the processor to monitor the temperature of a transmitting unit within the mobile station during the communication with the communication network via the radio link.

17. The computer program of claim 14, wherein the first routine comprises a routine that directs the processor to provide a user-selectable multi-slot based power class designation to the communication network.

18. The computer program of claim 14, wherein the second routine comprises:
- a routine that directs the processor to receive an assignment message from the communication network based on the multi-slot based power class designation, the assignment message including an assigned power level and an assigned number of slots; and
- a routine that directs the processor to transmit data to the communication network via an uplink based on the assigned power level and the assigned number of slots.

19. The computer program of claim 14 is operable in accordance with a time division multiple access (TDMA) based communication protocol.

20. The computer program of claim 14, wherein the medium is one of paper, a programmable gate array, application specific integrated circuit, erasable programmable read only memory, read only memory, random access memory, magnetic media, and optical media.

21. In a wireless communication system, wherein a communication network is operable to provide communication services to a mobile station, a method for preventing overheating of a transmitting unit within the mobile station, the method comprising:
- transmitting a multi-slot based power class designation to the communication network, the multi-slot based power class designation being associated with a plurality of power levels of the mobile station and a number of slots corresponding to each of the plurality of power levels;
- receiving an assignment message from the communication network based on the multi-slot based power class designation, the assignment message including an assigned power level and an assigned number of slots;
- transmitting data from the transmitting unit to communication network via an uplink based on the assigned power level and the assigned number of slots;
- monitoring the temperature of the transmitting unit during transmission of data to the communication network via the uplink;
- suspending transmission of data to the communication network via the uplink in response to detecting the temperature of the transmitting unit exceeding an overheat threshold, the overheat threshold being associated with a condition suggesting overheating of the transmitting unit; and
- resuming communication with the communication network via the uplink in response to detecting the temperature of the transmitting unit being below the overheat threshold.

* * * * *